(12) United States Patent
Choi et al.

(10) Patent No.: US 12,249,733 B2
(45) Date of Patent: Mar. 11, 2025

(54) BATTERY MODULE AND BATTERY PACK INCLUDING THE SAME

(71) Applicant: LG ENERGY SOLUTION, LTD., Seoul (KR)

(72) Inventors: Jonghwa Choi, Daejeon (KR); Junyeob Seong, Daejeon (KR); Myungki Park, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 489 days.

(21) Appl. No.: 17/641,395

(22) PCT Filed: Feb. 9, 2021

(86) PCT No.: PCT/KR2021/001729
§ 371 (c)(1),
(2) Date: Mar. 8, 2022

(87) PCT Pub. No.: WO2021/201421
PCT Pub. Date: Oct. 7, 2021

(65) Prior Publication Data
US 2022/0302549 A1    Sep. 22, 2022

(30) Foreign Application Priority Data
Apr. 1, 2020  (KR) .................. 10-2020-0039760

(51) Int. Cl.
*H01M 50/35*    (2021.01)
*H01M 10/60*    (2014.01)
(Continued)

(52) U.S. Cl.
CPC .......... *H01M 50/35* (2021.01); *H01M 10/60* (2015.04); *H01M 10/65* (2015.04); *H01M 50/211* (2021.01); *H01M 50/505* (2021.01)

(58) Field of Classification Search
CPC ....... H01M 10/60; H01M 10/65; H01M 50/35
See application file for complete search history.

(56) References Cited

U.S. PATENT DOCUMENTS 10,629,879 B2 * 4/2020 Qin ..................... H01M 50/325
11,335,970 B2 * 5/2022 Kwon .................. H01M 50/35
(Continued)

FOREIGN PATENT DOCUMENTS

CN    102569690 A    7/2012
CN    110114906 A    8/2019
(Continued)

OTHER PUBLICATIONS

International Search Report for PCT/KR2021/001729 (PCT/ISA/210) mailed on Jun. 3, 2021.
(Continued)

Primary Examiner — Amanda C. Walke
(74) Attorney, Agent, or Firm — Birch, Stewart, Kolasch & Birch, LLP (57) ABSTRACT

The battery module includes a module frame into which a battery cell stack, in which a plurality of battery cells are stacked, is inserted, and an end plate that covers front and rear surfaces of the battery cell stack and is coupled to the module frame, wherein a terminal busbar opening and a connector opening are formed on the end plate, and a venting part is formed at a lower end of the end plate spaced apart from the terminal busbar opening and the connector opening.

12 Claims, 9 Drawing Sheets

(51) Int. Cl.
   *H01M 10/65*   (2014.01)
   *H01M 50/211*  (2021.01)
   *H01M 50/505*  (2021.01)

(56) References Cited

U.S. PATENT DOCUMENTS

| | | |
|---|---|---|
| 2010/0035142 A1 | 2/2010 | Ha et al. |
| 2012/0114984 A1 | 5/2012 | Kim et al. |
| 2012/0114985 A1 | 5/2012 | Kim et al. |
| 2012/0114992 A1 | 5/2012 | Kim et al. |
| 2012/0115011 A1 | 5/2012 | Kim |
| 2012/0115013 A1 | 5/2012 | Kim et al. |
| 2012/0115016 A1 | 5/2012 | Kim |
| 2013/0252037 A1 | 9/2013 | Chiba |
| 2016/0260947 A1 | 9/2016 | Amagai |
| 2017/0025664 A1 | 1/2017 | Lim et al. |
| 2017/0125770 A1 | 5/2017 | Kim et al. |
| 2019/0140235 A1 | 5/2019 | Lindstrom et al. |
| 2019/0245175 A1 | 8/2019 | Qin et al. |
| 2019/0267591 A1 | 8/2019 | Park et al. |
| 2019/0288252 A1 | 9/2019 | Qin et al. |
| 2020/0343499 A1 | 10/2020 | Yoo et al. |
| 2021/0226295 A1 | 7/2021 | Kwon et al. |
| 2022/0115736 A1 | 4/2022 | Oh et al. |

FOREIGN PATENT DOCUMENTS

| | | | |
|---|---|---|---|
| EP | 2 450 978 A2 | 5/2012 | |
| EP | 3 525 255 A1 | 8/2019 | |
| EP | 3 576 180 A1 | 12/2019 | |
| EP | 3 699 976 A1 | 6/2020 | |
| EP | 3 866 252 A1 | 8/2021 | |
| EP | 4152500 A1 * | 3/2023 | .......... H01M 50/117 |
| JP | 2012-99477 A | 5/2012 | |
| JP | 2013-197019 A | 9/2013 | |
| JP | 2016-134335 A | 7/2016 | |
| JP | 6128197 B2 | 5/2017 | |
| JP | 6183466 B2 | 8/2017 | |
| JP | 2019-140083 A | 8/2019 | |
| JP | 2019-160611 A | 9/2019 | |
| JP | 2020-501320 A | 1/2020 | |
| KR | 10-2008-0025428 A | 3/2008 | |
| KR | 10-1106111 B1 | 1/2012 | |
| KR | 10-2012-0047800 A | 5/2012 | |
| KR | 10-2014-0056835 A | 5/2014 | |
| KR | 10-2014-0077811 A | 6/2014 | |
| KR | 10-2018-0113416 A | 10/2015 | |
| KR | 10-2017-0010531 A | 2/2017 | |
| WO | WO 2019/203460 A1 | 10/2019 | |
| WO | WO 2020/009484 A1 | 1/2020 | |
| WO | WO 2021/125469 A1 | 6/2021 | |
| WO | WO-2022154374 A1 * | 7/2022 | .......... H01M 10/613 |

OTHER PUBLICATIONS

Extended European Search Report for European Application No. 21782132.1 dated Sep. 5, 2023.

\* cited by examiner

【FIG. 1】

Conventional Art

BATTERY MODULE AND BATTERY PACK INCLUDING THE SAME

TECHNICAL FIELD

Cross Citation with Related Application(s)

This application claims the benefit of Korean Patent Application No. 10-2020-0039760 filed on Apr. 1, 2020 in the Korean Intellectual Property Office, the disclosure of which is incorporated herein by reference in its entirety.

The present disclosure relates to a battery module and a battery pack including the same, and more particularly, to a battery module having enhanced stability, and a battery pack including the same.

BACKGROUND ART

As technology development and demands for mobile devices increase, the demand for batteries as energy sources is rapidly increasing. Accordingly, many researches of the battery capable of meeting a variety of needs are emerging.

A secondary battery has attracted considerable attention as an energy source for power-driven devices, such as an electric bicycle, an electric vehicle, and a hybrid electric vehicle, as well as an energy source for mobile devices, such as a mobile phone, a digital camera, and a laptop computer.

Recently, along with a continuous rise of the necessity for a large-capacity secondary battery structure, including the utilization of the secondary battery as an energy storage source, there is a growing demand for a battery pack of a multi-module structure which is an assembly of battery modules in which a plurality of secondary batteries are connected in series/parallel.

Meanwhile, when a plurality of battery cells are connected in series or in parallel to configure a battery pack, it is common to configure a battery module composed of at least one battery cell first, and then configure a battery pack by using at least one of the battery modules and adding other components. Since the battery cells constituting these middle or large-sized battery modules are composed of chargeable/dischargeable secondary batteries, such a high-output and large-capacity secondary battery generates a large amount of heat in a charging and discharging process.

The battery module includes a battery cell stack in which a plurality of battery cells are stacked, a frame for housing the battery cell stack, and end plates for covering the front and rear surfaces of the battery cell stack.

Figure 1:
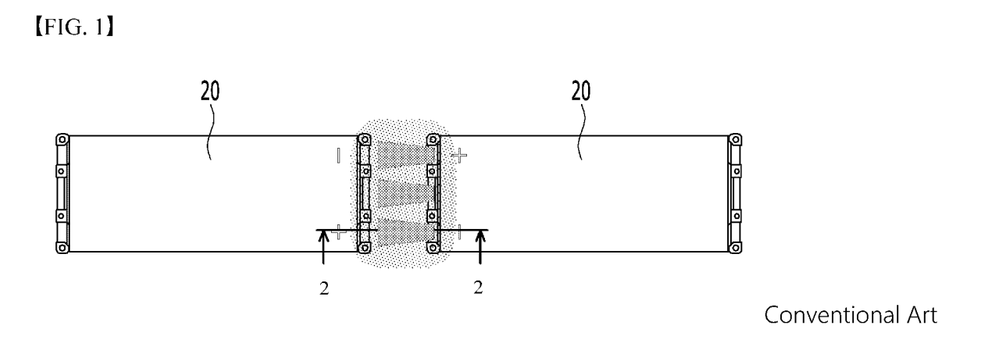
FIG. 1 is a view illustrating the appearance of a battery module mounted on a conventional battery pack at the time of ignition.
Figure 2:
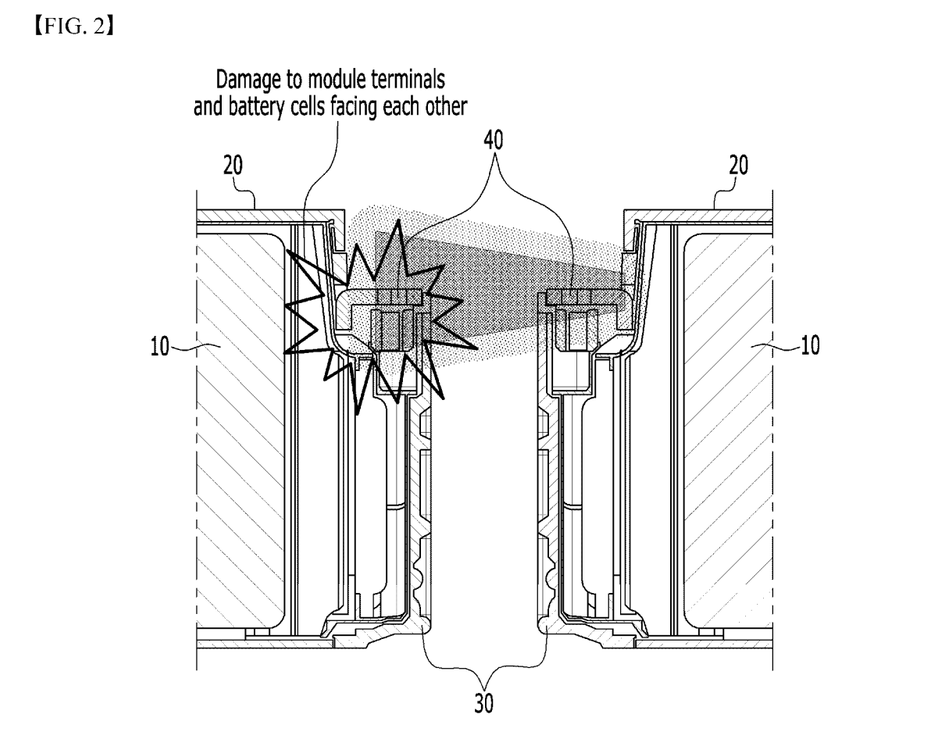
FIG. 2 illustrates a section taken along line 2-2 in FIG. 1 and is a view illustrating the appearance of a flame affecting adjacent battery modules when a battery module mounted on a conventional battery pack ignites.

FIG. 1 is a view illustrating the appearance of a battery module mounted on a conventional battery pack at the time of ignition. FIG. 2 illustrates section 2-2 of FIG. 1 and is a view illustrating the appearance of a flame affecting adjacent battery modules when a battery module mounted on a conventional battery pack ignites.

Referring to FIGS. 1 and 2, the conventional battery module includes a battery cell stack in which a plurality of battery cells 10 are stacked, a frame 20 for housing the battery cell stack, end plates 30 formed on the front and rear surfaces of the battery cell stack, terminal bus bar 40 formed so as to protrude to the outside of the end plates, and the like.

The frame 20 and the end plate 30 can be coupled so as to be sealed by welding. When the frame 20 and the end plate 30 for housing the battery cell stack are coupled in this way, the internal pressure of the battery cells 10 increases during overcharge of the battery module. Thus, when a limit value of the welding strength of the battery cell is exceeded, the high-temperature heat, gas, and flame generated in the battery cells 10 can be discharged to the outside of the battery cell 10.

At this time, the high-temperature heat, gas and flame may be discharged through the openings formed in the end plates 30. However, in a battery pack structure in which a plurality of battery modules are arranged so that the end plates 30 face each other, it may affect a battery module located adjacent to battery modules that eject high-temperature heat, gas and flame. Thereby, the terminal bus bar 40 formed on the end plates 30 of the adjacent battery modules may be damaged, and high-temperature heat, gas, and flame may enter the inside of the battery module via the openings formed in the end plates 30 of the adjacent battery modules to damage the plurality of battery cells 10.

DETAILED DESCRIPTION OF THE INVENTION

Technical Problem

It is an object of the present disclosure to provide a battery module capable of dispersing high-temperature heat and flame discharged when an ignition phenomenon occurs in the battery module, and a battery pack including the same.

However, the technical problem to be solved by embodiments of the present disclosure is not limited to the above-described problems, and can be variously expanded within the scope of the technical idea included in the present disclosure.

Technical Solution

According to one embodiment of the present disclosure, there is provided a battery module comprising: a battery cell stack having a plurality of battery cells, a module frame into which the battery cell stack is inserted, and a pair of end plates that cover front and rear surfaces of the battery cell stack, respectively, and are coupled to the module frame, wherein a terminal busbar opening and a connector opening are formed on at least one end plate of the pair of end plates, and a vent is formed at a lower end of the at least one end plate spaced apart from the terminal busbar opening and the connector opening.

The vent may have a hole which is formed at the lower end of the at least one end plate.

The hole may have a discharge port formed in a direction in which electrode leads protrude out from the plurality of battery cells.

The hole may have a discharge port through which gas is discharged toward the lower end of the at least one end plate.

The hole may obliquely penetrate the at least one end plate.

The hole may have an oblique direction that is closer to the lower end of the at least one end plate from an upper end of the at least one end plate.

The vent includes an inflow port that is formed at a lower end of the module frame to correspond to a direction in which the electrode lead protrudes from the battery cell, and a discharge port that discharges gas flown in through the inflow port, and the discharge port may be formed in a direction that is perpendicular to the inflow port.

The vent further includes a connector formed between the inflow port and the discharge port to guide the gas flown into the inflow port toward the discharge port, and the connector may have an oblique direction that is close to the lower end of the at least one end plate from an upper end of the end plate.

According to another embodiment of the present disclosure, there is provided a battery pack comprising: two or more battery modules as described above, wherein a first battery module and a second battery module of the two or more battery modules each have an opening formed at one side facing each other.

The vent of the first battery module may be formed on one side facing the second battery module.

Advantageous Effects

According to the embodiments of the present disclosure, in order to control high temperature heat, gas and flame when a heat runaway phenomenon occurs inside the battery module, a venting part can be formed below the terminal busbar among a front surface or a rear surface of the battery module, thereby minimizing a damage that can be caused by adjacent battery modules.

The effects of the present disclosure are not limited to the effects mentioned above and additional other effects not described above will be clearly understood from the description of the appended claims by those skilled in the art.

DETAILED DESCRIPTION OF THE EMBODIMENTS

Hereinafter, various embodiments of the present disclosure will be described in detail with reference to the accompanying drawings so that those skilled in the art can easily carry out them. The present disclosure may be modified in various different ways, and is not limited to the embodiments set forth herein.

Portions that are irrelevant to the description will be omitted to clearly describe the present disclosure, and like reference numerals designate like elements throughout the specification.

Further, in the figures, the size and thickness of each element are arbitrarily illustrated for convenience of description, and the present disclosure is not necessarily limited to those illustrated in the figures. In the figures, the thickness of layers, regions, etc. are exaggerated for clarity. In the figures, for convenience of description, the thicknesses of some layers and regions are shown to be exaggerated.

In addition, it will be understood that when an element such as a layer, film, region, or plate is referred to as being "on" or "above" another element, it can be directly on the other element or intervening elements may also be present. In contrast, when an element is referred to as being "directly on" another element, it means that other intervening elements are not present. Further, the word "on" or "above" means disposed on or below a reference portion, and does not necessarily mean being disposed on the upper end of the reference portion toward the opposite direction of gravity.

Further, throughout the specification, when a portion is referred to as "including" a certain component, it means that the portion can further include other components, without excluding the other components, unless otherwise stated.

Further, throughout the specification, the phrase "in a plan view" means when a target object is viewed from the above, and the phrase "in a cross-section view" means when a cross-section taken by vertically cutting a target portion is viewed cut from the side.

Figure 3:
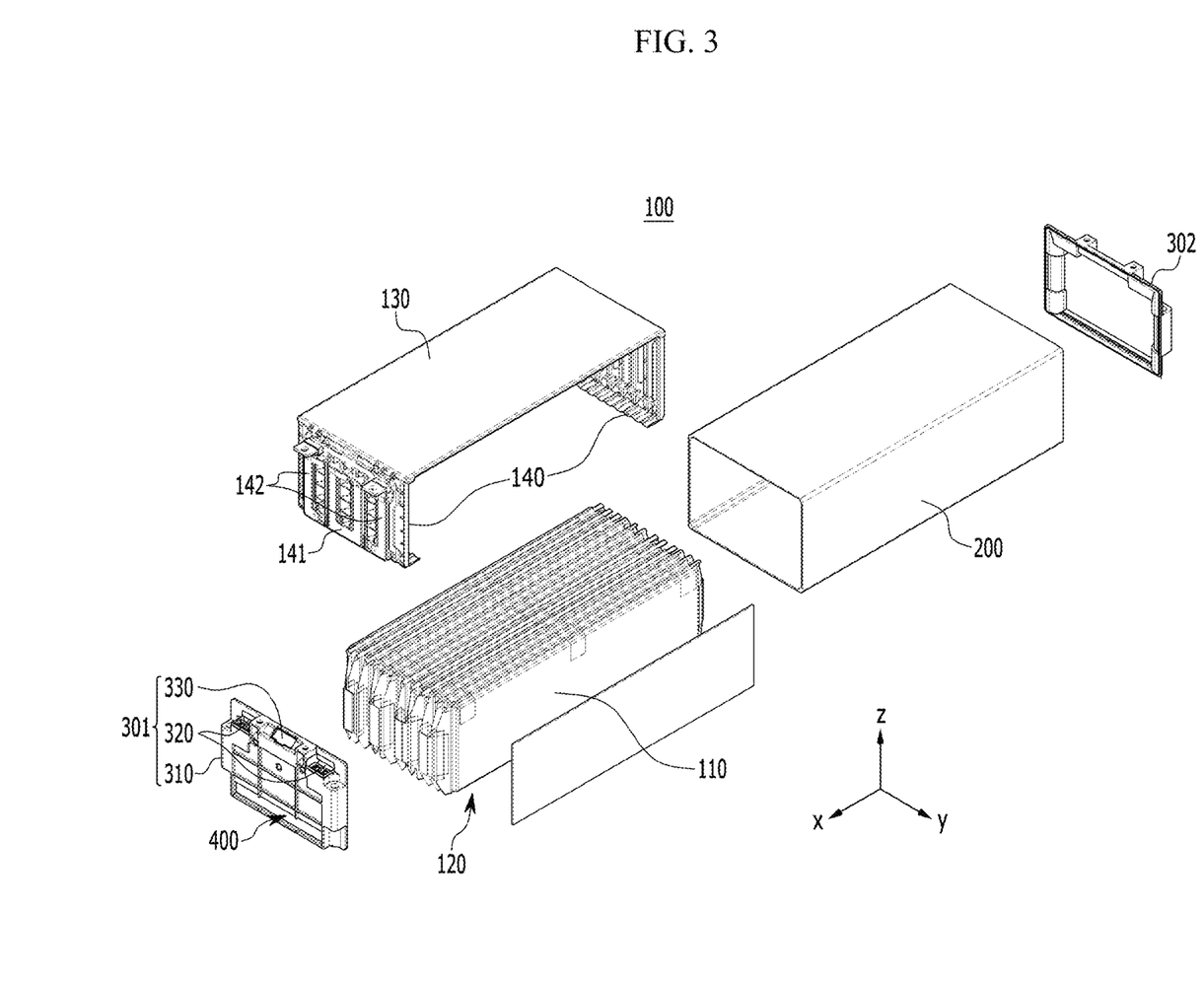
FIG. 3 is an exploded perspective view illustrating a battery module according to an embodiment of the present disclosure.
Figure 4:
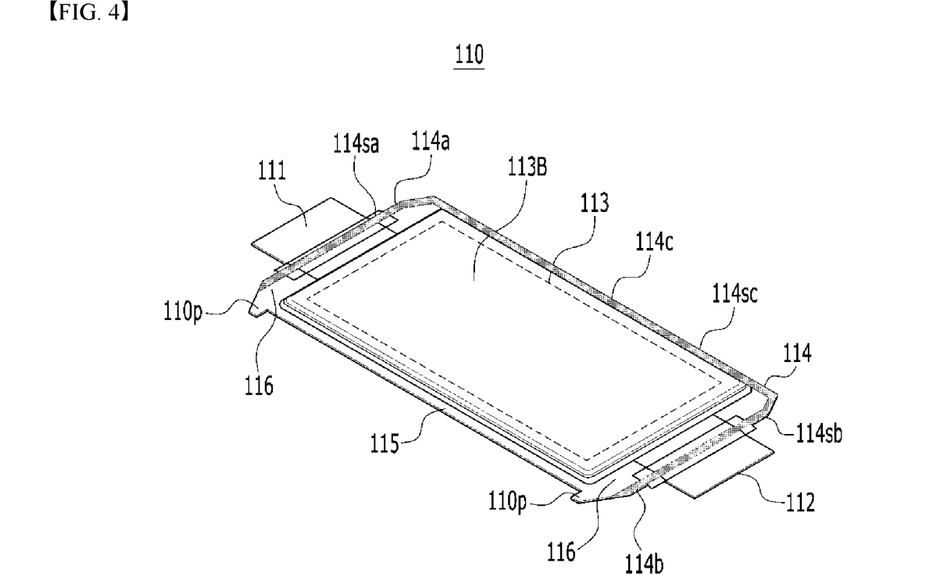
FIG. 4 is a perspective view of a battery cell included in the battery module of FIG. 3.
Figure 5:
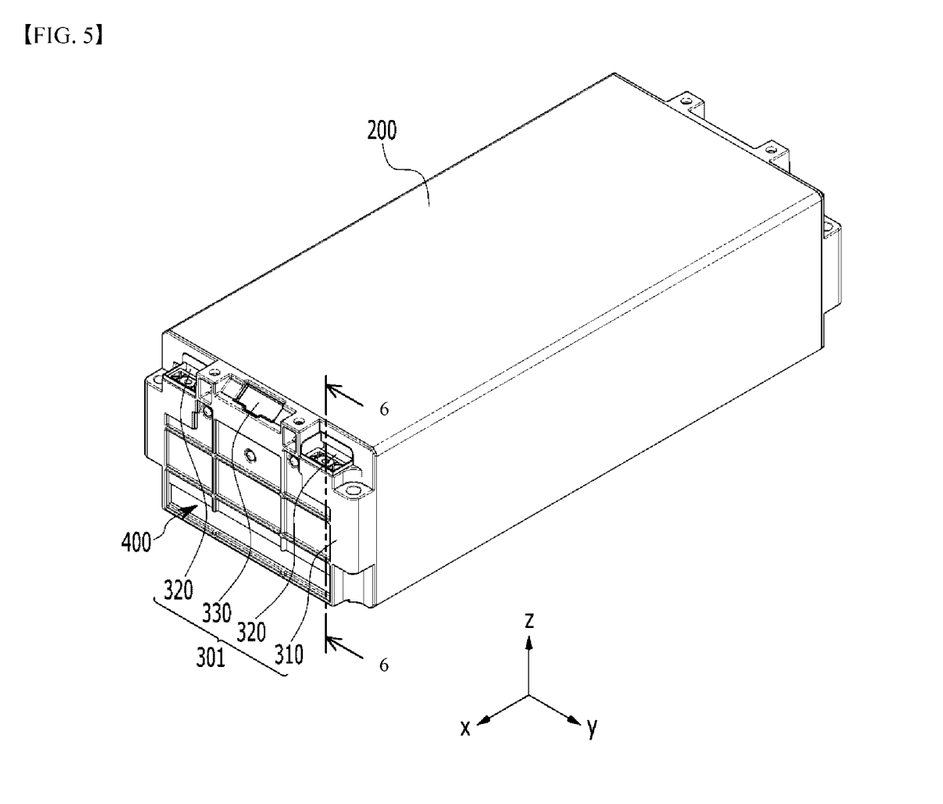
FIG. 5 is a perspective view illustrating a state in which the battery module of FIG. 3 is coupled.
Figure 6:
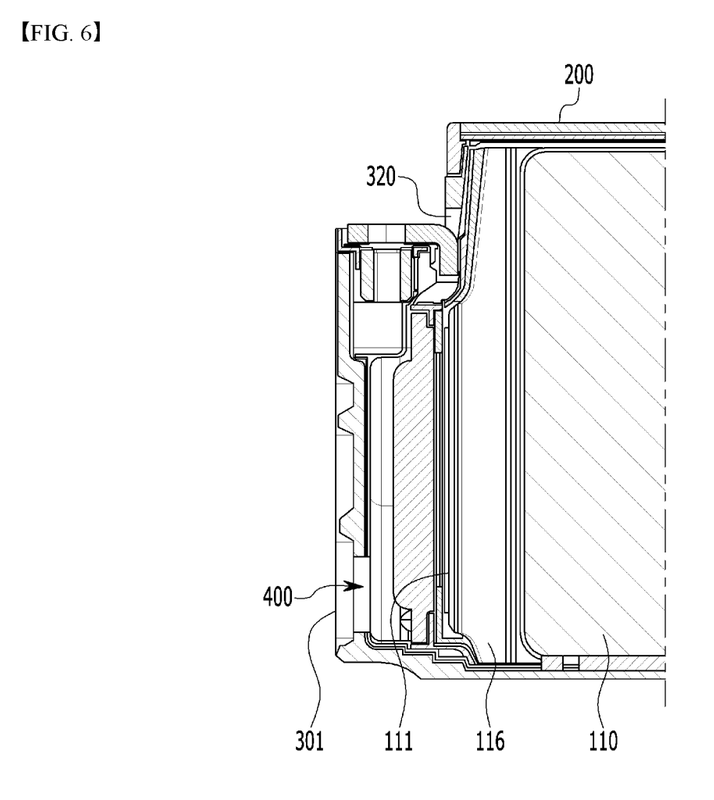
FIG. 6 is a cross-sectional view taken along the line 6-6 in FIG. 5.
Figure 7:
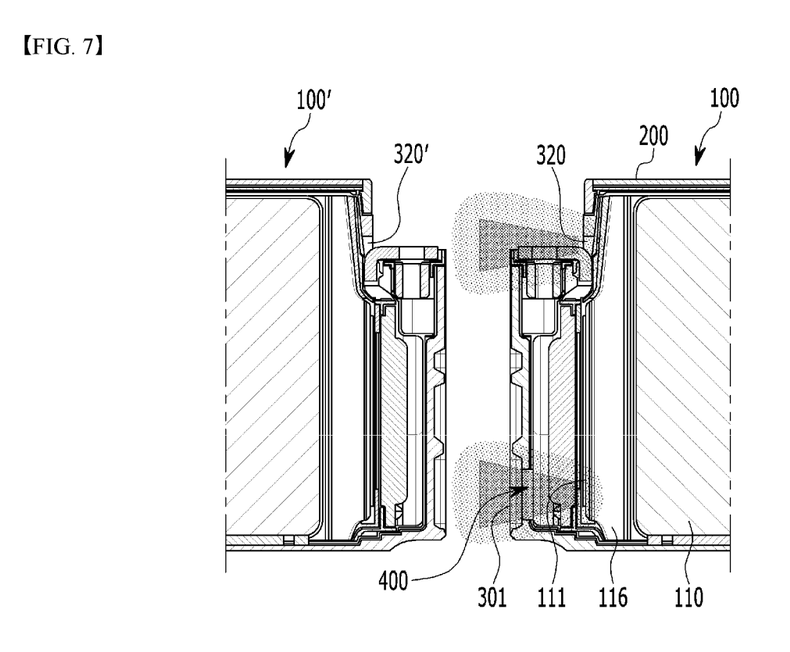
FIG. 7 is a view showing a state of flames affecting adjacent battery modules when the battery module of FIG. 6 ignites.

FIG. 3 is an exploded perspective view illustrating a battery module according to an embodiment of the present disclosure. FIG. 4 is a perspective view of a battery cell included in the battery module of FIG. 3. FIG. 5 is a perspective view illustrating a state in which the battery module of FIG. 3 is coupled. FIG. 6 is a cross-sectional view taken along the line 6-6 in FIG. 5. FIG. 7 is a view illustrating a state of flames affecting adjacent battery modules when the battery module of FIG. 6 ignites.

Referring to FIGS. 3 to 5, the battery module 100 according to an embodiment of the present disclosure includes a battery cell stack 120 in which a plurality of battery cells 110 are stacked, a module frame 200 for housing the battery cell stack 120, and first and second end plates 301 and 302 for covering the front and rear surfaces of the battery cell stack 120, respectively. The first and second end plates 301 and 302 may each include a mounting part 310 for coupling with the pack frame.

A terminal busbar opening 320 and a connector opening 330 are formed on the end plate 301 according to this embodiment, and a venting part 400 is formed at the lower end of the end plate 301 spaced apart from the terminal busbar opening 320 and the connector opening 330. The venting part 400 as used herein means a portion for discharging heat or gas inside the battery module 100.

Hereinafter, a configuration of one battery cell 110 will be described with reference to FIG. 4.

Referring to FIG. 4, the battery cell 110 may be a secondary battery, and may be configured of a pouch type secondary battery. The battery cell 110 may include an electrode assembly 113, a cell case 114, and electrode leads 111 and 112 protruded from the electrode assembly 113.

The electrode assembly 113 may be composed of a positive electrode plate, a negative electrode plate, a separator, and the like. The cell case 114 is for packaging the electrode assembly 113 and may be formed of a laminate sheet including a resin layer and a metal layer. The cell case 114 may include a case main body 113B and a cell terrace 116.

The case main body 113B may house the electrode assembly 113. To achieve this, a housing space capable of housing the electrode assembly 113 is provided in the case main body 113B. The cell terrace 116 may extend from the case main body 113B and may be sealed so that the electrode assembly 113 can be sealed.

The electrode leads 111 and 112 may be electrically connected to the electrode assembly 113. The electrode leads 111 and 112 may be provided with a pair including a negative electrode lead 111 and a positive electrode lead 112. A part of the pair of the electrode leads 111 and 112 may be protruded from a front side (+X-axis direction) and a rear side (−X-axis direction) of the cell case 114 to the outside of the cell terrace 116, respectively.

Meanwhile, the battery cell 110 may be manufactured by sealing both ends 114a and 114b of the cell case 114 and one side part 114c for connecting these ends in a state where the battery assembly 113 is housed in the cell case 114. That is, the battery cell 110 according to the embodiment of the present disclosure includes a total of three sealing parts 114sa, 114sb and 114sc, the sealing parts 114sa, 114sb, and 114sc have a structure capable of being sealed by a method such as heat fusion, and the remaining other side part may be composed of a connection part 115.

Further, the connection part 115 may be extended long along one periphery of the battery cell 110, and a protrusion 110p of the battery cell 110, which is called as bat-ear, may be formed at an end of the connection part 115. Further, the cell case 114 may be sealed at an interval between the protruded electrode leads 111 and 112.

The configuration of the battery cell 110 as described above is one example, and the shape of the battery cell 110 for constituting the battery cell stack may be variously modified.

The battery cells 110 may be formed of a plurality of cells, and the plurality of the battery cells 110 may be stacked to be electrically connected to each other, thereby forming the battery cell stack 120. An upper plate 130 may be located on an upper side of the battery cell stack 120, and busbar frames 140 may be located on a front surface and a rear surface of the battery cell stack 120, which are directions in which the electrode leads 111 and 112 are protruded, respectively. The battery cell stack 120, the upper plate 130 and the busbar frame 140 may be housed together in the module frame 200.

A thermally conductive resin can be injected between the battery cell stack 120 and a lower surface of the module frame 200, and a thermally conductive resin layer (not illustrated) can be formed between the battery cell stack 120 and the lower surface of the module frame 200 through the injected thermally conductive resin. Through the module frame 200, the battery cell stack 120 housed in the interior the module frame 200 and components connected thereto can be protected from a physical impact of the outside.

The busbar frames 140 are located on the front surface and the rear surface of the battery cell stack 120, respectively, to guide connection of the battery cell stack 120 and an external device simultaneously while covering the battery cell stack 120. In detail, a busbar 141 and a terminal busbar 142 can be mounted on the busbar frame 140. The electrode leads 111 and 112 of the battery cell 110 pass through a slit formed in the busbar frame 140 and then are curved so that they can be joined to the busbar 141 and the terminal busbars 142. The battery cells 110 constituting the battery cell stack 120 may be connected in series or in parallel through the busbar 141, and the external device or circuit and the battery cells 110 may be connected through the terminal busbars 142 exposed to the outside of the battery module 100. Further, a connector (not illustrated) may be mounted on the busbar frame 140, and a temperature or voltage data of the battery cell 110 measured through a sensing assembly (not illustrated) can be transmitted to an external BMS (battery management system) or the like through a connector (not illustrated).

End plates 301 and 302 are formed so as to cover the front surface and the rear surface of the battery cell stack 120. In detail, a first end plate 301 and a second end plate 302 may be located on the front surface and the rear surface of the battery cell stack 120, respectively. The end plates 301 and 302 can protect the busbar frame 140 and plural electronic components connected thereto from external impact and need to have a predetermined strength to achieve this and may include a metal such as aluminum.

A terminal busbars opening 320 and a connector opening 330 for allowing the terminal busbars 142 and the connector (not illustrated) mounted on the busbar frame 140 to connect with the outside are formed in the end plates 301 and 302, and gas or heat generated from the battery cell 110 can be discharged to the outside of the battery module 100 through the openings 320 and 330. The end plates 301 and 302 and the module frame 200 are coupled by welding, and the plurality of battery cells 110 located inside the module frame 200 and the end plates 301 and 302 can be interrupted from being connected with the outside except for the above-mentioned openings 320 and 330, through the coupling structure of the end plates 301 and 302 and the module frame 200 sealed by welding.

The conventional battery module can discharge high-temperature heat, gas or flame, which are generated from the battery cells, through openings, as described above. However, in a battery pack structure in which the plurality of battery module are disposed such that the end plates face each other, high-temperature heat, gas and flame, which are discharged from the battery module, may damage adjacent battery modules.

Thus, the venting part 400 can be formed in the surface part of the end plate 301 according to the embodiment of the present disclosure to disperse heat, gas, flame and the like, which are discharged through the openings 320 and 330. The venting part 400 may have a hole structure which is formed in a side surface part of the end plate 301. The lower end of the end plate 301 is a portion spaced apart from the terminal busbar opening 320 and the connector opening 330. The hole structure according to this embodiment may have a shape in which the lower end of the end plate 301 is cut long along the y-axis, as illustrated in FIGS. 3, 5, and 6. Such a shape may be deformable, and as an example, a plurality of portions cut along the y-axis may be formed.

Through the venting part 400, the discharge path of the interior of the battery module 100 can be diversified, thereby preventing a phenomenon in which the discharge is concentrated to only a part of the battery module 100 at the time of ignition, and dispersing the discharge of high-temperature heat, gas and flame. In particular, adjacent other battery module may be disposed in the direction facing the venting unit 400, and a separate opening is prevented from being formed in the portion of the battery module facing the venting part 400, thereby being able to minimize damage to the adjacent battery module.

In the battery cell 110, a large amount of heat is generated from the electrode leads 111 and 112, and the cell terraces 116 adjacent thereto. While the cell terraces 116 are unsealed due to a change in pressure change inside the battery module 100, high-temperature gas and flame can be discharged. In this case, the venting part 400 according to this embodiment can be formed in the end plate 301 to immediately discharge high-temperature gas, and flame to the outside of the battery module 100.

Although not illustrated, the venting part may be additionally formed in the lower end of the second end plate 302.

FIG. 7 is a view showing a state of flames affecting adjacent battery modules when the battery module of FIG. 6 ignites.

Referring to FIG. 7, when the battery module 100 according to the embodiment of FIG. 6 ignites, gas or heat generated from the battery cell 110 is temporarily discharged to the outside of the battery module 100 through the terminal busbar opening 320 and the connector opening 330. By allowing the gas or heat discharged here to be transmitted through the opening 320' of the adjacent battery module 100', the flame easily propagates and safety is deteriorated. However, according to this embodiment, a venting part 400 is formed at the lower end of the end plate 301 spaced apart from the terminal busbar opening 320 and the connector opening 330, thereby being able to disperse gas and heat in a large amount. In this case, by preventing a separate opening from being formed in a portion of the adjacent battery module 100' facing the venting part 400, damage to the adjacent battery module can be minimized.

Figure 8:
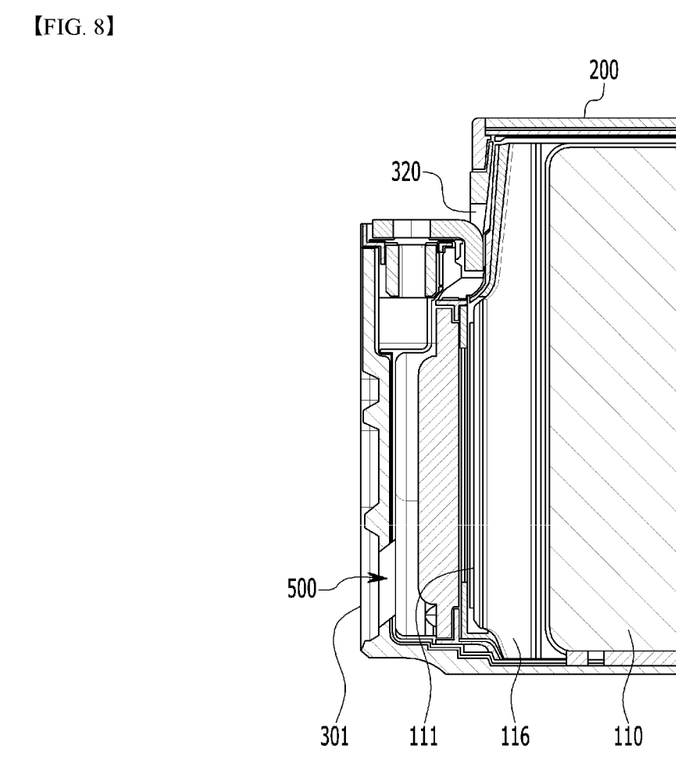
FIG. 8 is a cross-sectional view illustrating a battery module according to another embodiment of the present disclosure.

FIG. 8 is a cross-sectional view showing a battery module according to another embodiment of the present disclosure.

Referring to FIG. 8, the venting part 500 according to the embodiment of the disclosure may have a discharge port through which gas is discharged toward the lower end of the end plate 301. As an example, the venting part 500 has a hole structure, and the hole structure may obliquely penetrate the end plate 301. In detail, an inner inflow port of the obliquely penetrated venting part 500 may be formed to be closer to the first end plate 301 than an outer discharge port, and the outer discharge port may be formed to be closer to the second end plate 302 than the inner inflow port.

Through the structure as described above, directionality can be naturally given to heat or gas discharged through the venting part 500. That is, the venting part 500 can guide so as to discharge gas to the portion of the battery module located farther away therefrom, thereby preventing a damage of another battery module that is adjacent to the first end plate 301 through this.

Further, the venting part 500 according to the embodiment of the disclosure has the advantages in that it has a penetrated hole structure, does not require a separate additional space, and can simply give the directionality of the discharged gas only by penetrating the module frame 200.

Figure 9:
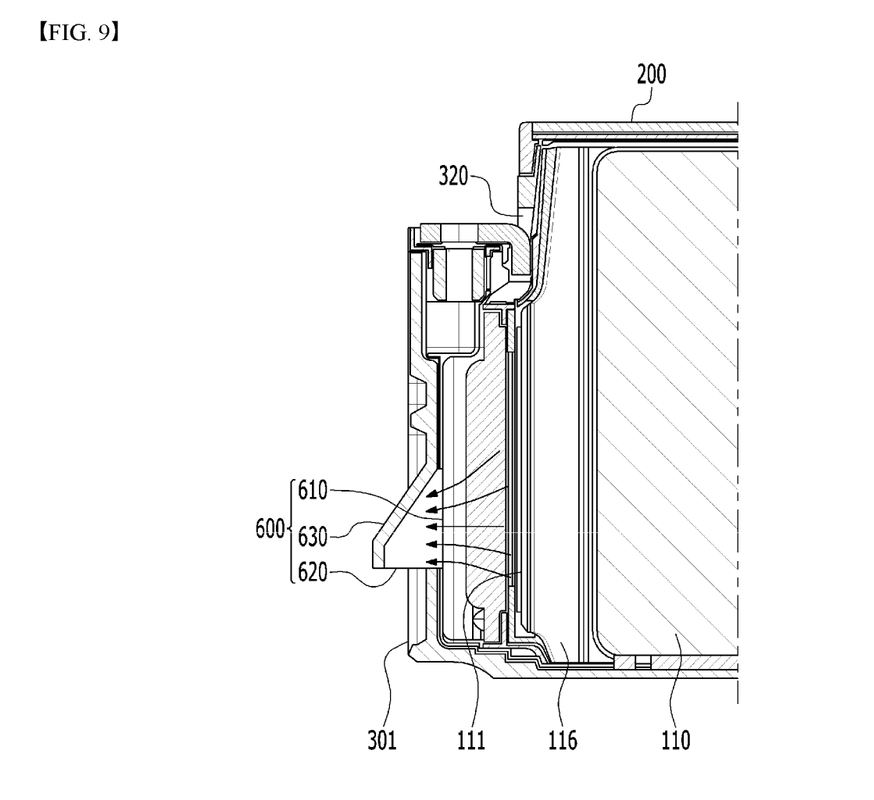
FIG. 9 is a cross-sectional view illustrating a battery module according to another embodiment of the present disclosure.

FIG. 9 is a cross-sectional view illustrating a battery module according to another embodiment of the present disclosure.

Referring to FIG. 9, the venting part 600 may include an inflow port 610 formed at the lower end of the end plate 301 to correspond to the direction in which the electrode lead 111 protrudes in the battery cell 110, a discharge port 620 for discharging gas flown in through the inflow port 610, and a connection part 630 for connecting the inflow port 610 and the discharge port 620.

The discharge port 620 may be formed in a direction that is perpendicular to the inflow port 610. Further, the connection part 630 may have a shape which is protruded from the end plate 301, and may be formed in an inclined manner.

Based on the structure as described above, the venting part 600 according to the embodiment of the present disclosure can more securely guide heat or gas inside the battery module so as to be not ejected in the direction of the adjacent battery module 100' shown in FIG. 7. That is, it has the advantage that the directionality of heat or gas can be given more securely. Further, the connection part 630 can act as a kind of a cover to interrupt external spatters from entering the interior of the battery module.

Meanwhile, the number of the above-mentioned venting parts 400, 500, and 600 according to the embodiment of the present disclosure is not specially limited, and may be formed of one or a plurality of the venting parts.

Referring to FIG. 3 again, the module frame 200 according to the embodiment of the present disclosure may be a structure of a mono frame or a structure in which an upper cover is coupled to a U-shaped frame. First, the mono frame may be in the form of a metal plate, of which an upper surface, a lower surface, and both side surfaces are integrated, and may be manufactured through extrusion molding. Next, in a case of structure in which the upper cover is coupled to the U-shaped frame, it may be formed by coupling the upper cover onto an upper side of the U-shaped frame which is a metal plate in which a lower surface, and both side surfaces are integrated, and may also be manufactured by press molding.

Figure 10:
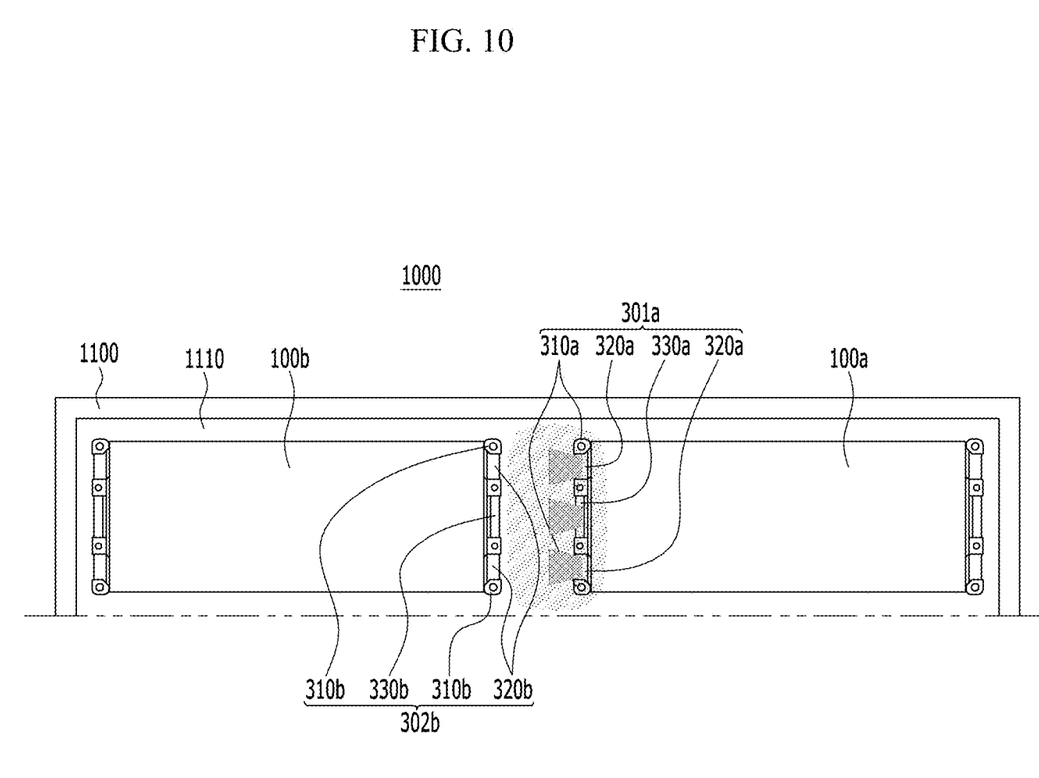
FIG. 10 is a plan view of a battery pack according to an embodiment of the present disclosure when viewed from above.

FIG. 10 is a plan view of a battery pack 1000 according to an embodiment of the present disclosure when viewed from above.

Referring to FIG. 10, the battery pack 1000 according to an embodiment of the present disclosure may include two or more of the battery modules 100a and 100b as described above.

The battery modules 100a and 100b may be housed in a pack frame 1100 and may be mounted together with various control and protection systems such as a BMS (battery management system), a cooling system, and the like.

A first battery module 100a and a second battery module 100b each may have openings 320a, 330a, 320b, and 330b formed on one side facing each other.

In detail, a first end plate 301a of the first battery module 100a and a second end plate 302b of the second battery module 100b may face each other. At this time, a terminal busbar opening 320a and a connector opening 330a may be formed in the first end plate 301a, and a terminal busbar opening 320b, and a connector opening 330b may be formed in the second end plate 302b.

The battery module 100a according to the embodiment of the present disclosure can provide the above-mentioned venting part in a lower end of the first end plate 301a, thereby reducing heat, gas, flame, and the like discharged through the openings 320a and 330a.

In addition, a separate venting part is not formed at the lower end of the second end plate 302b included in the second battery module 100b adjacent to the first battery module 100a and facing each other, thereby being able to minimize damage that may be caused by the second battery module 100b.

The battery modules 100a and 100b according to the embodiment of the present disclosure may be spaced apart from a side surface part 1110 of the pack frame 1100. Although not illustrated, the battery module 100a and 100b may have a support member formed between the side surface part of the module frame 200 and the pack frame 1100. The support member can prevent the battery modules 100a and 100b from moving in the interior of the pack frame 1100.

The battery module or the battery pack according to this embodiment as described above can be applied to various devices. These devices may be applied to transportation means such as an electric bicycle, an electric vehicle, a hybrid vehicle, but the present disclosure is not limited thereto and can be applied to various devices that can use the battery module, which also falls under the scope of the present disclosure.

Although the preferred embodiments of the present disclosure have been illustrated and described, the present disclosure is not limited to the above-described particular embodiments, various modifications and improvements can be made by those skilled in the art without departing from the scope and spirit as disclosed in the accompanying claims, and these modifications and improvements should not be understood separately from the scope and spirit of the invention.

DESCRIPTION OF REFERENCE NUMERALS

200: module frame
301, 302: end plate
400, 500, 600: venting part
320, 330: opening

The invention claimed is:

1. A battery module comprising:
a battery cell stack having a plurality of battery cells;
a module frame into which the battery cell stack is inserted; and
a pair of end plates that cover front and rear surfaces of the battery cell stack, respectively, and are coupled to the module frame,
wherein a terminal busbar opening and a connector opening are formed on at least one end plate of the pair of end plates, and a vent is formed at a lower end of the at least one end plate below the terminal busbar opening and the connector opening, and
wherein the vent is directed downwardly.

2. The battery module according to claim 1, wherein the vent has a hole which is formed at the lower end of the at least one end plate.

3. The battery module according to claim 2, wherein the hole has a discharge port formed in a direction in which electrode leads protrude out from the plurality of battery cells.

4. The battery module according to claim 2, wherein the hole has a discharge port through which gas is discharged toward the lower end of the at least one end plate.

5. The battery module according to claim 4, wherein the hole obliquely penetrates the at least one end plate.

6. The battery module according to claim 5, wherein the hole structure has an oblique direction in which an inflow port is formed to be closer to an upper end of the first end plate than the outer discharge port.

7. The battery module according to claim 4, wherein the end plate has an inner surface and an outer surface, and
wherein the vent comprises an opening in the inner surface and an opening in the outer surface, the opening in the outer surface being lower than the opening in the inner surface.

8. The battery module according to claim 4, wherein the end plate has an inner surface and an outer surface, and
wherein the vent comprises an opening in the end plate and a connection part extending outwardly and downwardly from the outer surface of the end plate.

9. The battery module according to claim 1, wherein the vent comprises:
an inflow port that is formed at a lower end of the module frame to correspond to a direction in which the electrode lead protrudes from the battery cell; and
a discharge port that discharges gas flown in through the inflow port,
wherein the discharge port is formed in a direction that is perpendicular to the inflow port.

10. The battery module according to claim 9, wherein the venting part further comprises:
a connector formed between the inflow port and the discharge port to guide the gas flown into the inflow port toward the discharge port,
wherein the connector has an oblique direction in which the inflow port is formed to be closer to an upper end of the first end plate than the outer discharge port.

11. A battery pack comprising:
two or more battery modules as set forth in claim 1,
wherein a first battery module and a second battery module of the two or more battery modules each have an opening formed at one side facing each other.

12. The battery pack according to claim 11, wherein the vent of the first battery module is formed on one side facing the second battery module.

* * * * *